G. M. DONALDSON.
NUT LOCK.
APPLICATION FILED MAY 22, 1915.
1,206,822.
Patented Dec. 5, 1916.
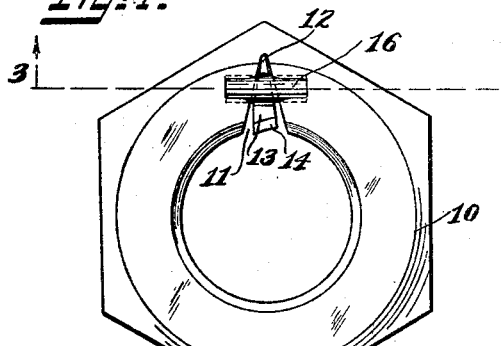
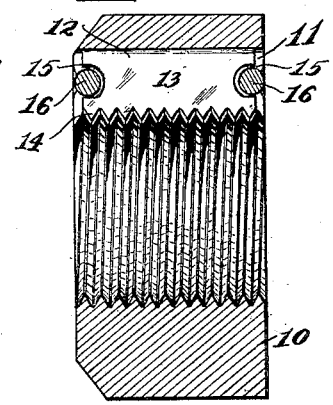
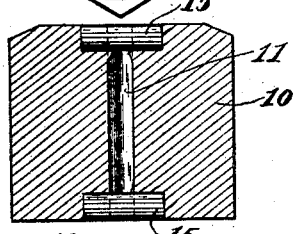
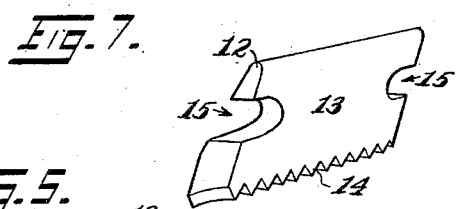
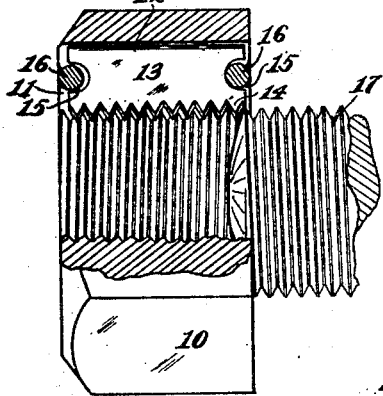
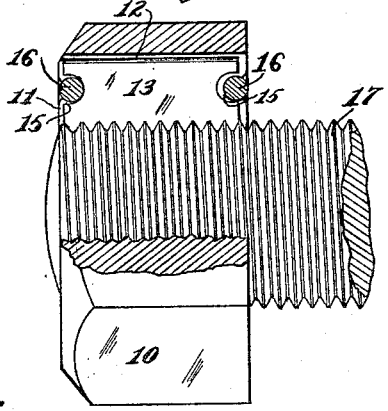
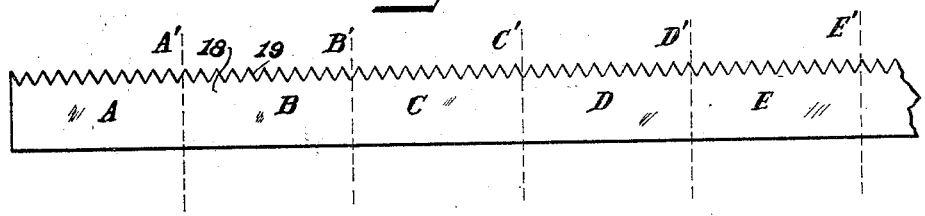
Witnesses:
Charles Horton
H. D. Penney
Inventor:
George M. Donaldson,
By his Att'y T. H. Richards.

UNITED STATES PATENT OFFICE.

GEORGE M. DONALDSON, OF BOSTON, MASSACHUSETTS, ASSIGNOR, BY MESNE ASSIGNMENTS, TO FLOATING WEDGE LOCK NUT CO. INC., A CORPORATION OF NEW YORK.

NUT-LOCK.

1,206,822.  Specification of Letters Patent.  Patented Dec. 5, 1916.

Application filed May 22, 1915. Serial No. 29,739.

*To all whom it may concern:*

Be it known that I, GEORGE M. DONALDSON, a citizen of the United States, residing in Boston, in the county of Suffolk and State of Massachusetts, have invented certain new and useful Improvements in Nut-Locks, of which the following is a specification.

This invention relates to improvements in nut locks of the class in which there is provided a wedge located in a recess of the nut, the wedge being rockably supported so as to permit turning of the nut in one direction but normally locking the nut against turning in the other direction.

The main object of the present invention is to provide an arrangement with which a wedge can be used in which the particular location of the threads is immaterial so as to facilitate the manufacture of the wedges, or in other words, to provide an arrangement permitting the use of a wedge which, when made in commercial quantities, has been cut in a practical manner that is without reference to where the threads end or commence.

Another object of the invention is to provide an arrangement by which the locking wedge can be anchored in place in an economical and practical manner for which purpose the wedge is provided with a notch at each of its ends, and a pin is rolled into the nut across each end of its wedge-receiving recess so that such pins will extend into the recesses of the wedge.

These and other features, capabilities and advantages of the invention will appear from the subjoined detail description of one specific embodiment thereof illustrated in the accompanying drawings in which—

Figure 1 is a plan view of a nut equipped with the present improvement. Fig. 2 is an axial section of the same. Fig. 3 is a section along the line 3—3 of Fig. 1. Fig. 4 is a fragmental view showing the respective positions of the wedge and bolt when the bolt is being introduced into the nut. Fig. 5 is a fragmental view showing the respective positions of the wedge and bolt after the bolt has been secured in the nut. Fig. 6 is a blank of wire that has been serrated or threaded along one edge but not yet cut into wedges. Fig. 7 is a perspective of a finished wedge provided with a notch at each of its ends.

In the embodiment shown, there is provided a nut 10 of the usual hexagonal conformation, threaded in its bore and having a V-shaped recess 11 extending in an axial direction to said nut with its diverging ends terminating in the wall of the bore of said nut.

The inner end of said V-shaped recess 11 is rounded to form a seat for the diminished rounded end 12 of the wedge 13 which is provided with serrations or threads 14 along its enlarged end. The width of the wedge 13 is substantially equal to the width of the seat of the V-shaped recess 11 at its rounded end 12 but in its outward direction toward the enlarged end provided with the threads 14, the wedge gradually diminishes in width relatively to the width of the V-shaped recess 11, in other words, in its outward direction toward its enlarged end, the width of the wedge 12 progressively becomes less than the corresponding progressive enlarging width of the V-shaped recess 11. The threads 14 of the wedge 13 correspond in pitch to the threads of the nut 10.

The wedge 13 in length is preferably less than the axial length of the nut 10 as shown in Fig. 2 and is provided at each of its ends with a rounded notch 15 to receive a pin 16 whereby the wedge is anchored in position in said recess 11. The pins 16 are preferably rolled into the nut 10 across the ends of the V-shaped recess 11 and into the notches 15 of the wedge 13, the pins being composed of a tougher and more resistant material than the nut. The dimensions of the pins 16, the depths of the notches 15, and the relative dimensions of the pins 16 to the depths of the notches 15 is such as to permit the wedge 13 to move in an axial direction a distance substantially equal to at least the length of one-half a pitch of the threads of the nut. This floating condition of the wedge is provided in order to permit the movement of such wedge 13 relative to the nut 10 into a position where its threads 14 will register with the threads of the nut 10. This movement is conveniently effected by means of the bolt 17 while being secured in such nut 10 in the following manner: Granted that the wedge 13 is initially located at the extreme entrance end of the nut 10 as shown in Fig. 4, the end of the bolt 17 when introduced into the nut 10 will engage the entrance end of the wedge 13 and move it with it until its threads 14 register with the threads of the nut 10 so that the threads of the bolt 17 may engage in and travel through the same.

That the axial movement of the wedge 13 relative to the nut 10 should be at least a distance equal to the length of one-half a pitch of a thread will be understood when it is noted that if the axial movement were less than one-half a pitch and the crests of the threads 14 of the wedge 13 at its initial position would be disposed exactly in alinement with the troughs of the threads of the nut 10, a movement less than one-half a pitch would not position the threads 14 of the wedge 13 into proper alinement with the threads of the nut 10. With the foregoing arrangement, the practical manufacture of the wedges 13 is thereby made possible. In other words, it becomes immaterial where the threads commence or end,—thus a piece of wire 18 as shown in Fig. 6, being provided with serrations or threads 19 along one of its edges, may be cut into sections A, B, C, D, E, etc. with the divisions A', B', C', D', E', etc. crossing or bisecting, as in some cases, the threads 19 in as many different variety of locations as there are divisions, division E' in the present instance substantially extending across the crest of a thread, the divisions B' and C' across the troughs of threads, and the divisions A' and D' substantially between the crests and troughs of threads, it being entirely immaterial where the threads end or commence on these wedges when they are used in the present arrangement. In the manufacture of these wedges, the notches 15 may be cut simultaneously with the cutting of the wedges from the wire blank 18.

Although the pins 16 are described as having been rolled into the nut 10, to form the anchoring means for the wedge 13, these pins may also be secured in place by the drop-press method, in which they are pressed into the nut in a vertical direction.

It is obvious from the foregoing that various changes and modifications in the details of construction may be made without departing from the general scope of the invention.

I claim:

1. In a nut lock, the combination with a nut having a threaded bore, there being a V-shaped recess extending axially therethrough, the diverging ends of which recess terminate in the wall of the bore of said nut, of a wedge in said recess having threads along one of its edges to register with the threads of said bore, there being a notch in each end of said wedge, and pins rolled into said nut to cross the ends of said recess and to extend into the notches of said wedge, the depths of said notches relative to the positions of such pins being such that the wedge has an axial movement equal in distance at least to the length of one-half a pitch of said threads.

2. In a nut lock, the combination with a nut having a threaded bore, there being a V-shaped recess extending axially therethrough, the diverging ends of which recess terminate in the wall of the bore of said nut, of a wedge in said recess having threads along one of its edges to register with the threads of said bore, there being a notch in each end of said wedge, and pins rolled into said nut to cross the ends of said recess and to extend into the notches of said wedge.

3. In a nut lock, the combination with a nut having a threaded bore, there being a recess extending axially therethrough, the ends of which terminate in the wall of the bore of said nut, of a wedge in said recess having threads along one of its edges to register with the threads of said bore, and pins rolled into said nut to cross the ends of said recess and to anchor said wedge in said recess.

4. In a nut lock, the combination with a nut having a threaded bore, there being a recess extending axially therethrough, the ends of which terminate in the wall of the bore of said nut, of a wedge in said recess having threads along one of its edges to register with the threads of said bore, pins rolled into said nuts to cross the ends of said recess, and conformations on said wedge to coöperate with said pins to anchor said wedge in said recess.

5. In a nut lock, the combination with a nut having a threaded bore, there being a recess extending axially therethrough, the ends of which recess terminate in the wall of the bore of said nut, of a wedge in said recess having threads along one of its edges to register with the threads of said bore, pins secured in said nut across the ends of said recess, and conformations on said wedge coöperating with said pins to anchor said wedge in said recess.

6. In a nut lock, the combination with a nut having a threaded bore, there being a recess extending axially therethrough, the ends of said recess terminating in the wall of said bore of said nut, of a wedge in said recess having threads along one of its edges to register with the threads of said bore, and anchoring means disposed at each end of said recess to anchor said wedge in said recess, said anchoring means permitting said wedge to have an axial movement equal in distance at least to the length of one-half a pitch of said threads.

7. In a nut lock, the combination with a nut having a threaded bore, there being a recess extending axially therethrough, the ends of which recess terminate in the wall of the bore of said nut, of a wedge in said recess having threads along one of its edges, the location of said threads with reference to where they begin or end being immaterial, and anchoring means disposed at each end of said recess to anchor said wedge in said recess, said anchoring means permitting said wedge to have an axial movement equal in distance at least to the length of one-half a pitch of said threads in order that said wedge can be moved relative to said nut so that its threads will aline with the threads in said nut should they be out of alinement in initial position.

GEORGE M. DONALDSON.

Witnesses:
JOHN GAW, Jr.,
MYRON A. CROWE.

Copies of this patent may be obtained for five cents each, by addressing the "Commissioner of Patents. Washington, D. C."